(12) United States Patent
Ko et al.

(10) Patent No.: US 8,819,709 B2
(45) Date of Patent: Aug. 26, 2014

(54) DISK LOADING APPARATUS FOR OPTICAL DISK DRIVE

(71) Applicant: Toshiba Samsung Storage Technology Korea Corporation, Suwon-si (KR)

(72) Inventors: Joung-sug Ko, Seoul (KR); Sang-yun Baek, Seongnam-si (KR); Un-jin Choi, Suwon-si (KR); Cheol-woong Ahn, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/654,604

(22) Filed: Oct. 18, 2012

(65) Prior Publication Data

US 2013/0104155 A1 Apr. 25, 2013

(30) Foreign Application Priority Data

Oct. 24, 2011 (KR) ........................ 10-2011-0108809

(51) Int. Cl.
*G11B 17/051* (2006.01)
(52) U.S. Cl.
USPC .......................................................... 720/622
(58) Field of Classification Search
USPC .................... 720/600, 601, 617–625
See application file for complete search history.

(56) References Cited

U.S. PATENT DOCUMENTS

| | | | |
|---|---|---|---|
| 6,449,234 B1 * | 9/2002 | Ahn et al. ...................... | 720/619 |
| 6,577,579 B1 * | 6/2003 | Kakuta et al. ................. | 720/622 |
| 7,644,419 B2 | 1/2010 | Shizuya et al. | |
| 2001/0038595 A1 * | 11/2001 | Yamada et al. .............. | 369/77.1 |
| 2003/0174627 A1 * | 9/2003 | Suzuki ......................... | 369/77.1 |
| 2008/0250438 A1 | 10/2008 | Chiou et al. | |
| 2009/0199223 A1 * | 8/2009 | Ahn et al. ...................... | 720/608 |
| 2011/0061067 A1 * | 3/2011 | Negoro et al. ................ | 720/620 |

FOREIGN PATENT DOCUMENTS

JP 2005251250 A * 9/2005 ............. G11B 21/02

OTHER PUBLICATIONS

English translation of JP 2005251250 A.*

* cited by examiner

*Primary Examiner* — Nathan Danielsen
(74) *Attorney, Agent, or Firm* — NSIP Law

(57) ABSTRACT

Provided is a disk loading apparatus which includes a frame base on which a spindle motor is mounted. The apparatus includes a disk loading structure that loads a disk on the spindle motor, a plurality of sliders operating in connection with a loading lever, and a plurality of gears transferring the motive power to the plurality of sliders. The apparatus also includes a plurality of shafts to which the gears are coupled, and a plurality of slider guide walls that guide movement of the plurality of sliders. According to various aspects, the shafts and the slider guide walls are formed integrally with the frame base.

15 Claims, 11 Drawing Sheets

DISK LOADING APPARATUS FOR OPTICAL DISK DRIVE

CROSS-REFERENCE TO RELATED PATENT APPLICATION(S)

This application claims the benefit under 35 USC §119(a) of Korean Patent Application No. 10-2011-0108809, filed on Oct. 24, 2011, in the Korean Intellectual Property Office, the entire disclosure of which is incorporated herein by reference for all purposes.

BACKGROUND

1. Field

The following description relates to an optical disk drive, and more particularly, to a frame base of a slot-in optical disk drive.

2. Description of Related Art

In general, a slot-in optical disk drive loads a disk without the help of a tray. The slot-in optical disk drive typically includes a disk loading structure that has a complicated structure which includes a plurality of levers are to load a disk. It is desirable for the disk loading structure to safely transport a disk, and be economical at the same time. To safely load the disk, the disk loading structure should have a stable structure, be formed with a small number of components, and be easy to assemble.

Accordingly, a frame base that is strong, cost-effective, and that is easy to assemble is desirable.

SUMMARY

In an aspect, there is provided a disk loading apparatus including a frame base on which a spindle motor is mounted, a disk loading structure comprising a gear unit which includes a loading lever that loads a disk on the spindle motor, a plurality of sliders operating in connection with the loading lever, a loading motor that provides motive power to the plurality of sliders, and a plurality of gears transferring the motive power of the loading motor to the plurality of sliders, a plurality of shafts to which the plurality of gears are rotatably coupled, the plurality of shafts being integrally formed with the frame base, and a plurality of slider guide walls that guide movement of the plurality of sliders, the plurality of slider guide walls being integrally formed with the frame base.

The plurality of sliders may comprise a main slider that operates in direct connection with the gear unit, and a sub-slider that is disposed perpendicular to the main slider and operates in connection with the main slider.

The disk loading apparatus may further comprise a disk guide wall that is disposed at a side of the frame base to guide a loading of the disk, a rotating-type disk centering lever that is disposed adjacent to the disk guide wall to center an inserted disk with respect to the spindle motor, a disk eject lever to unload the disk that is loaded on the spindle motor, at a back of the frame base, and a shaft that supports rotation of the disk eject lever, wherein the shaft is integrally formed with the frame base.

The disk centering lever may comprise a shaft that is coupled to the frame base and an operating wall body that contacts and becomes separated from an edge portion of the disk.

The frame base may be formed of plastic.

In an aspect, there is provided an optical disk drive including a frame base, a sub-frame that is rotatably installed with respect to the frame base in a direction perpendicular to a plane of the frame base, a spindle motor mounted on the sub-frame, an optical pickup unit installed on the sub-frame at a side of the spindle motor, a disk loading structure comprising a gear unit including a loading lever that loads a disk on the spindle motor, a plurality of sliders operating in connection with the loading lever, a loading motor that provides motive power to the plurality of sliders, and a plurality of gears transferring the motive power to the plurality of sliders, a plurality of shafts to which the gears are rotatably coupled, the plurality of shafts being integrally formed with the frame base, and a plurality of slider guide walls that guide movement of the plurality of sliders, the plurality of slider guide walls being formed integrally with the frame base.

The plurality of sliders may comprise a main slider that operates in direct connection with the gear unit, and a sub-slider that is disposed perpendicular to the main slider and operates in connection with the main slider.

The optical disk drive may further comprise a disk guide wall that is disposed at a side of the frame base to guide a loading of the disk, a rotating-type disk centering lever that is disposed adjacent to the disk guide wall to center an inserted disk with respect to the spindle motor, a disk eject lever to unload the disk loaded on the spindle motor at a back of the frame base, and a shaft that supports rotation of the disk eject lever, wherein the shaft is integrally formed with the frame base.

The disk centering lever may comprise a shaft that is coupled to the frame base and an operating wall body that contacts or is separated from an edge portion of the disk.

The frame base may be formed of plastic.

In an aspect, there is provided a frame base for a slot-in optical disk drive that includes an optical disk loading structure which has a plurality of sliding members for guiding the centering of a disk that is inserted and a plurality of levers for loading and unloading the disk, the frame base including a slider guide wall for controlling the movement of the plurality of sliding members for guiding the centering of the disk that is inserted, and a plurality of gear shafts for receiving gears of the respective plurality of levers, wherein the frame base, the slider guide wall, and the plurality of gear shafts are integrally formed as a single component.

The body of the frame base may be formed of plastic.

The frame base may further comprise a spindle that is integrally formed with the frame base.

The frame base may further comprise a disk guide wall integrally formed with the frame based, and configured to guide a first portion of an edge of the disk that is being inserted, wherein the plurality of sliding members are configured to guide another portion of the edge of the disk that is being inserted.

The frame base, the slider guide wall, and the plurality of gear shafts may be manufactured to be the single component.

Other features and aspects may be apparent from the following detailed description, the drawings, and the claims.

Figure 1:
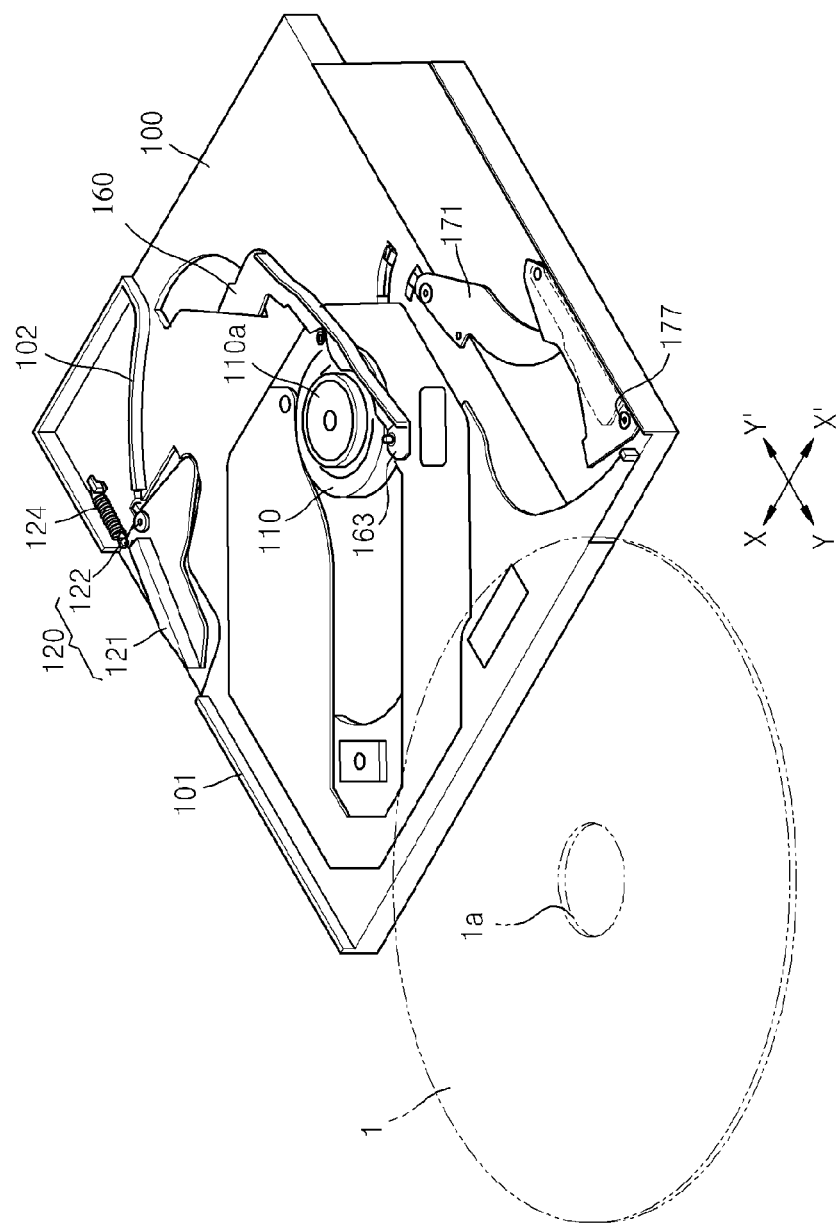
FIG. 1 is a diagram illustrating an example of an optical disk drive in which a disk loading apparatus is installed.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Various examples herein are directed towards a disk loading apparatus and an optical disk drive including the disk loading apparatus. The disk loading apparatus may be included in a terminal, for example, a computer, a Blu-ray player, a DVD player, an appliance, a television, and the like.

The disk loading apparatus includes a frame base. The frame base supports the structure of an optical disk drive. The frame base also includes a loading lever that loads a disk on a spindle motor, a plurality of sliders operating in connection with the loading lever, a loading motor that provides motive power to the plurality of sliders, and a gear unit including a plurality of gears that transfer the motive power of the loading motor to the sliders.

A slider guide wall that guides movement of the plurality of sliders and a gear shaft of the gear unit may be integrally included and formed on the frame base.

Figure 2:
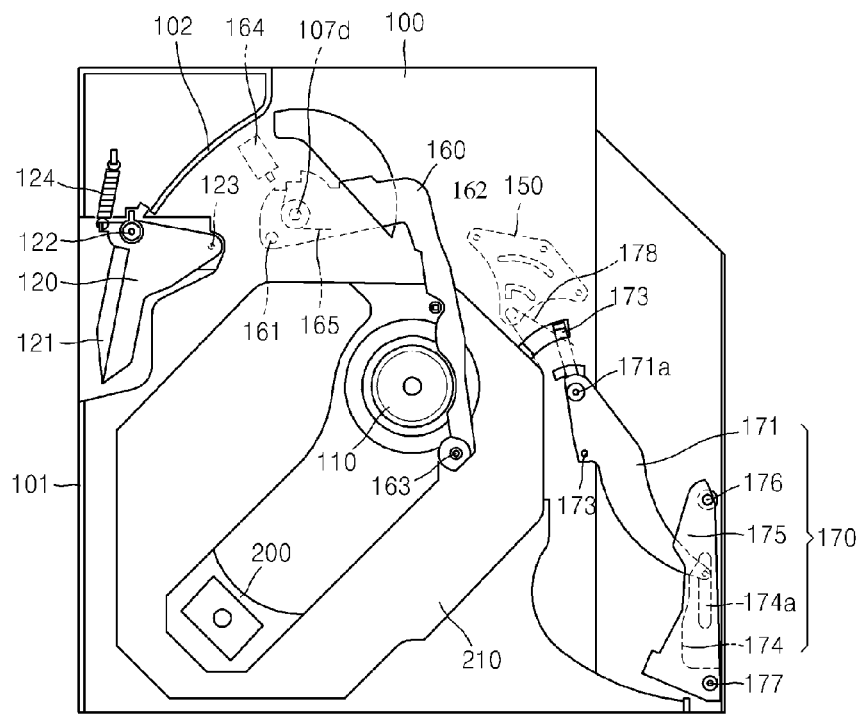
FIG. 2 is a diagram illustrating an interior of the optical disk drive of FIG. 1.
Figure 3:
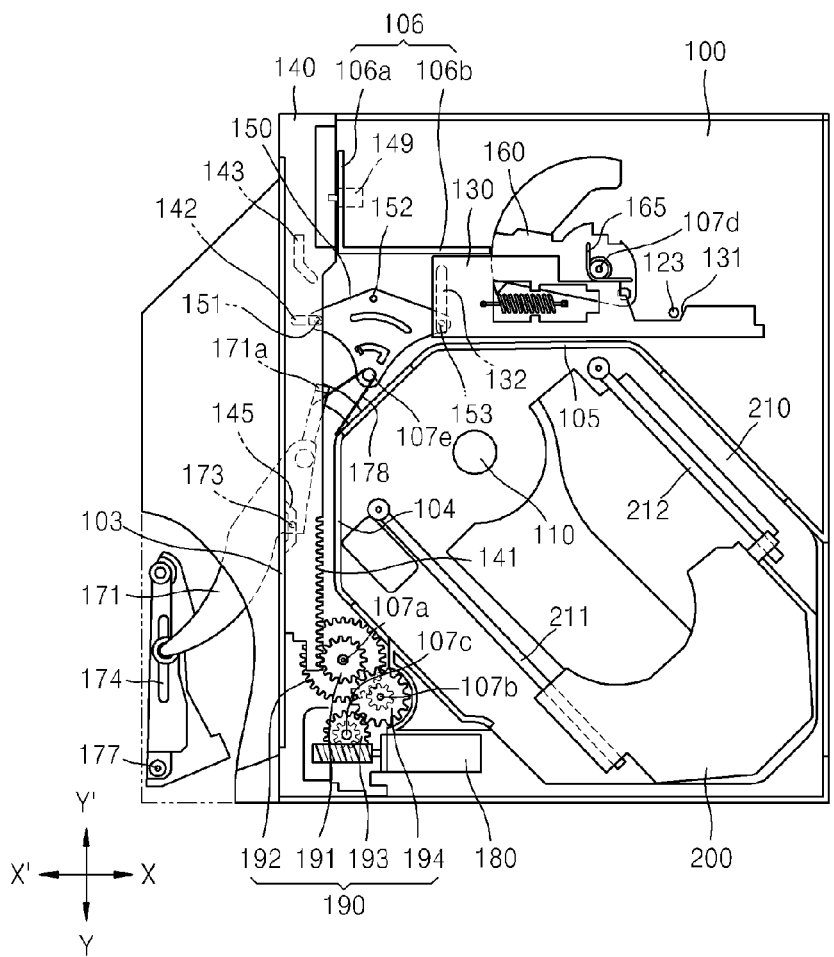
FIG. 3 is a diagram illustrating an example of a rear view of the optical disk drive of FIG. 1.

FIG. 1 illustrates an example of an optical disk drive in which a frame base 100 is installed, FIG. 2 illustrates an example of the interior of the optical disk drive of FIG. 1, and FIG. 3 illustrates an example of a rear view of the optical disk drive of FIG. 1.

Referring to FIGS. 1 and 2, a spindle motor 110 includes a spindle 110a on which a center hole 1a of a disk 1 may be mounted and which is disposed in a center of a body of the frame base 100. A disk guide wall that guides the disk 1 from a fixed position is integrally formed with the frame base 100 at a side of the frame base 100 as an element of the disk loading apparatus.

For example, the frame base 100 and the disk guide wall may be integrally formed using a plastic material. The disk guide wall includes a straight disk guide wall 101 and a curved disk guide wall 102. The straight disk guide wall 101 is oriented parallel to a disk entering direction, and the curved disk guide wall 102 is formed to correspond to an edge of the disk 1. A rotating-type disk centering lever 120 centers the disk 1 with respect to the spindle motor 110. The rotating-type disk centering lever 120 is disposed between the straight disk guide wall 101 and the curved disk guide wall 102, which are fixed on the frame base 100. The disk centering lever 120 includes an operating disk guide wall 121 that is approximately oriented in an extension direction Y-Y' of the straight disk guide wall 101 and contacts and becomes separated from an edge portion of the disk 1 and a guide pin 123 (see FIG. 3) that is interfered by a sub-slider 130. The disk centering lever 120 is rotatably supported by a shaft 122 that may be integrally formed with the frame base 100.

The sub-slider 130 operates in connection with a main slider 140 (see FIG. 3) via a rotating link lever 150, which is further described below, and movement of the sub-slider 130 is supported by main slider guide walls 103 and 104 and sub-slider guide walls 105 and 106 (see FIG. 3) which is further described below. The main slider 140, the sub-slider 130, and the rotating link lever 150 are included together in a structure that drives the disk centering lever 120, a loading lever structure 170 which is further described below, and a disk eject lever 160.

The disk centering lever 120 is elastically biased away from the spindle motor 110 by a tension spring 124. The disk eject lever 160 withdraws a loaded disk and is disposed at the back of the spindle motor 110. The disk eject lever 160 includes an eject member 163 that contacts an edge of the disk 1, a shaft 162 that is integrally coupled to the frame base 100, and a connection pin 161 that is connected to the sub-slider 130, and is elastically biased in a direction to pull the disk 1 via a torsion spring 165 installed on the shaft 162.

A loading lever structure 170 is located on the side of the frame base 100 opposite to the side of straight disk guide wall 101 (right side of the drawing). The loading lever structure 170 includes a first loading lever 171 that operates with respect to the main slider 140 (see FIG. 3) and a second loading lever 175 that is connected to the first loading lever 171. The first loading lever 171 and the second loading lever 175 include shafts 172 and 176, respectively, which are rotatably coupled to the frame base 100. The first loading lever 171 is elastically biased clockwise by a spring 178 shown in FIG. 2. A rear end portion 173 that interferes with a cam groove 145 (see FIG. 3) formed in the main slider 140 is disposed at the back of the first loading lever 171, and a loading member 177 contacting an edge of the disk 1 is disposed at a front end of the second loading lever 175. A first end portion of the first loading lever 171 is coupled to a cam structure 174a that is located between the shaft 176 of the second loading lever 175 and the loading member 177. The cam structure 174a is formed in cam member 174 that is integrally coupled to the second loading lever 175. Accordingly, when the main slider 140 operates via a disk loading motor 180, the first and second loading levers 171 and 175 rotate in the same direction.

The spindle motor 110, optical pickup apparatus 200, and guide shafts 211 and 212 which support movement of the optical pickup apparatus 200 are mounted on a sub-frame 210 that is coupled to the frame base 100. In this example, a first end portion of the sub-frame 210 is coupled via a hinge such that the first end portion thereof may be rotatable with respect to the frame base 100, and a second end portion of the sub-frame 210 is installed to contact the main slider 140 and the sub-slider 130 so as to move in a direction perpendicular to a plane of the frame base 100.

Referring to FIG. 3, the rotating link lever 150 is rotatably coupled to a shaft 107e that is integrally formed with the frame base 100. As described above, the disk eject lever 160 is rotatably coupled to a shaft 107e that may be integrally formed with the frame base 100, and is elastically biased by the torsion spring 165 installed on a shaft 107d so as to pull the disk 1.

The main slider 140 includes a spur gear 141, and a gear unit 190 includes a plurality of gears 191, 192, 193, and 194 is disposed at the end portion of the main slider 140 that includes the spur gear 141. Gear 191 and/or gear 192 contact spur gear 141 to drive the main slider 140. The gear unit 190 transfers motive power from the disk loading motor 180 which is included at the portion of the main slider 140. Gears 191 and 192 are rotatably supported by shaft 107a, gear 194 is rotatably supported by shaft 107b, and gear 193 is rotatably supported by shaft 107c. The shafts 107a, 107b, and 107c may be integrally formed with the frame base 100 when manufacturing the frame base 100, and thus, there is no distance deviation between the shafts 107a, 107b, and 107c as in a structure in which shafts are coupled to one another as separate components are used. The rotating link lever 150 and the first loading lever 171 are operated in connection with each other by an operation of the main slider 140 that moves in a direction that is uniformly maintained by the two slider guide walls 103 and 104 on the two sides of the main slider 140. The main slider 140, the rotating link lever 150, and the second loading lever 175 are operated in connection with one another via a cam structure that has a cam groove and a guide pin.

The rotating link lever 150 includes cam grooves 142 and 143 of the main slider 140 and first through third guide pins 151, 152, and 153. Guide pin 153 is coupled to a cam groove 132 of the sub-slider 130. In this example, the first and second guide pins 151 and 152 are coupled to the cam grooves 142 and 143 of the main slider 140, respectively, and the third guide pin 153 is coupled to the cam groove 132 formed in the sub-slider 130, thus reciprocally moving the sub-slider 130 in an X-X' direction based on reciprocal movement of the main slider 140. The main slider 140 is operated by the disk loading motor 180, in the Y-Y' direction. According to the operation of the sub-slider 130, the disk centering lever 120 and the disk eject lever 160 are operated in connection with each other.

The guide pin 123 of the disk centering lever 120 is rotated by a cam structure 131 of the sub-slider 130. The sub-slider 130 is disposed on a lower surface of the frame base 100, and moves in a direction X'-X that is perpendicular to the entering direction Y-Y' of the disk 1.

Figure 4:
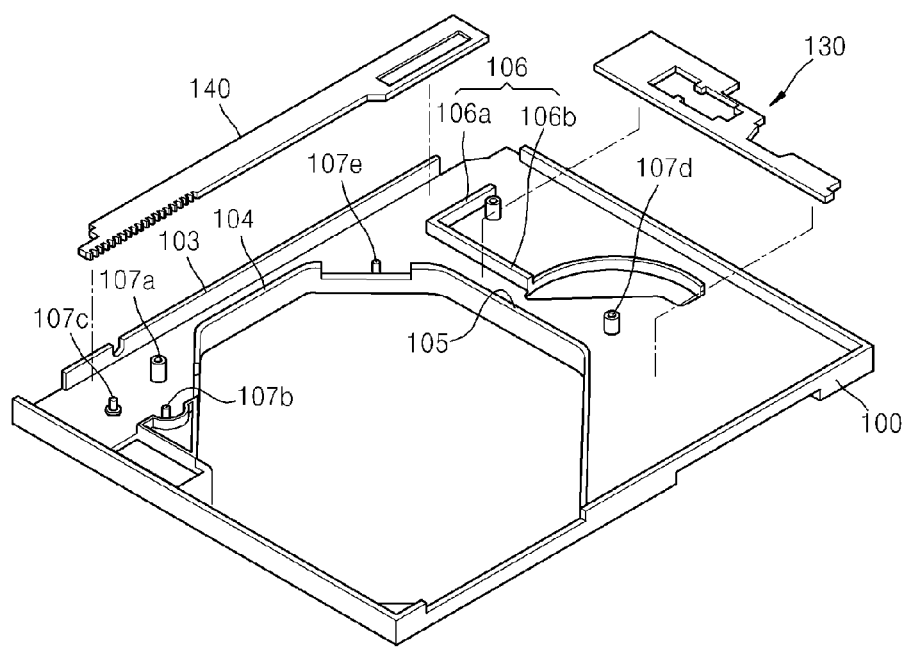
FIGS. 4 through 11 are diagrams illustrating additional examples of an optical disk drive to which a disk is loaded or unloaded.

In the example of FIGS. 1, 2, and 3, the plurality of the slider guide walls 103, 104, 105, and 106 and the plurality of shafts 107a, 107b, 107c, 107d, and 107e are integrally formed on the frame base 100. FIG. 4 illustrates an example of the frame base 100 for a disk drive including the shafts 107a, 107b, 107c, 107d, and 107e and the slider guide walls 103, 104, 105, and 106.

Referring to FIG. 4, the main slider guide walls 103 and 104 are disposed on two sides of an area in which the main slider 140 moves which is at a side of the frame base 100 (left side of the drawing). The sub-slider guide walls 105 and 106 are formed in a direction perpendicular to the main slider guide walls 103 and 104. In this example, the sub-slider guide wall 106, including a portion 106a guiding the main slider 140 and a portion 106b guiding the sub-slider 130, is L-shaped.

In the conventional art, shaft and wall components are separately manufactured and individually mounted on the frame base 100. As a result, in the conventional art variation in the distances between shafts is severe, and thus, the distances between the shafts must be adjusted during assembly.

According to various aspects herein, shafts 107a, 107b, 107c, 107d, and 107e are mounted on the frame base 100. The gears and levers described herein are rotatably coupled to the shafts 107a, 107b, 107c, 107d, and 107e. For example, the shafts 107a, 107b, and 107c to which gears of the loading lever structure 170 are coupled, are arranged in a triangular form. For example, in the conventional art distances between the shafts 107a, 107b, and 107c may influence an appropriate engagement between the gears 191, 192, and 193 that are respectively installed on the shafts 107a, 107b, and 107c and are engaged therewith. However, according to the current example, as the shafts 107a, 107b, 107c, 107d, and 107e are integrally manufactured with the frame base 100 at the same time, the distances between the shafts 107a, 107b, 107c, 107d, and 107e does not deviate from design dimensions.

Hereinafter, example operations of loading and unloading the disk 1 to an optical disk drive are described with reference to FIGS. 5 through 11.

Figure 5:
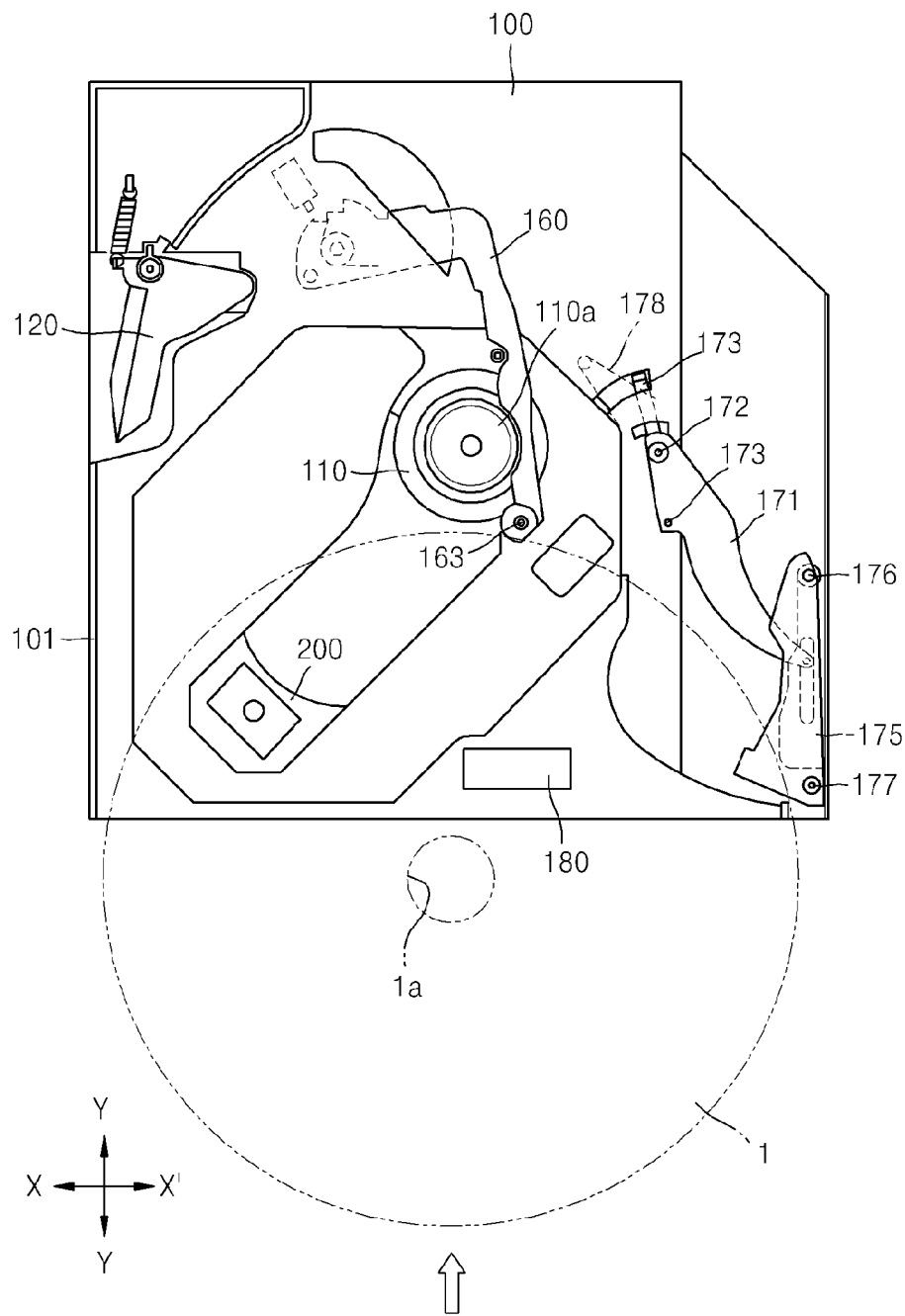
Figure 6:
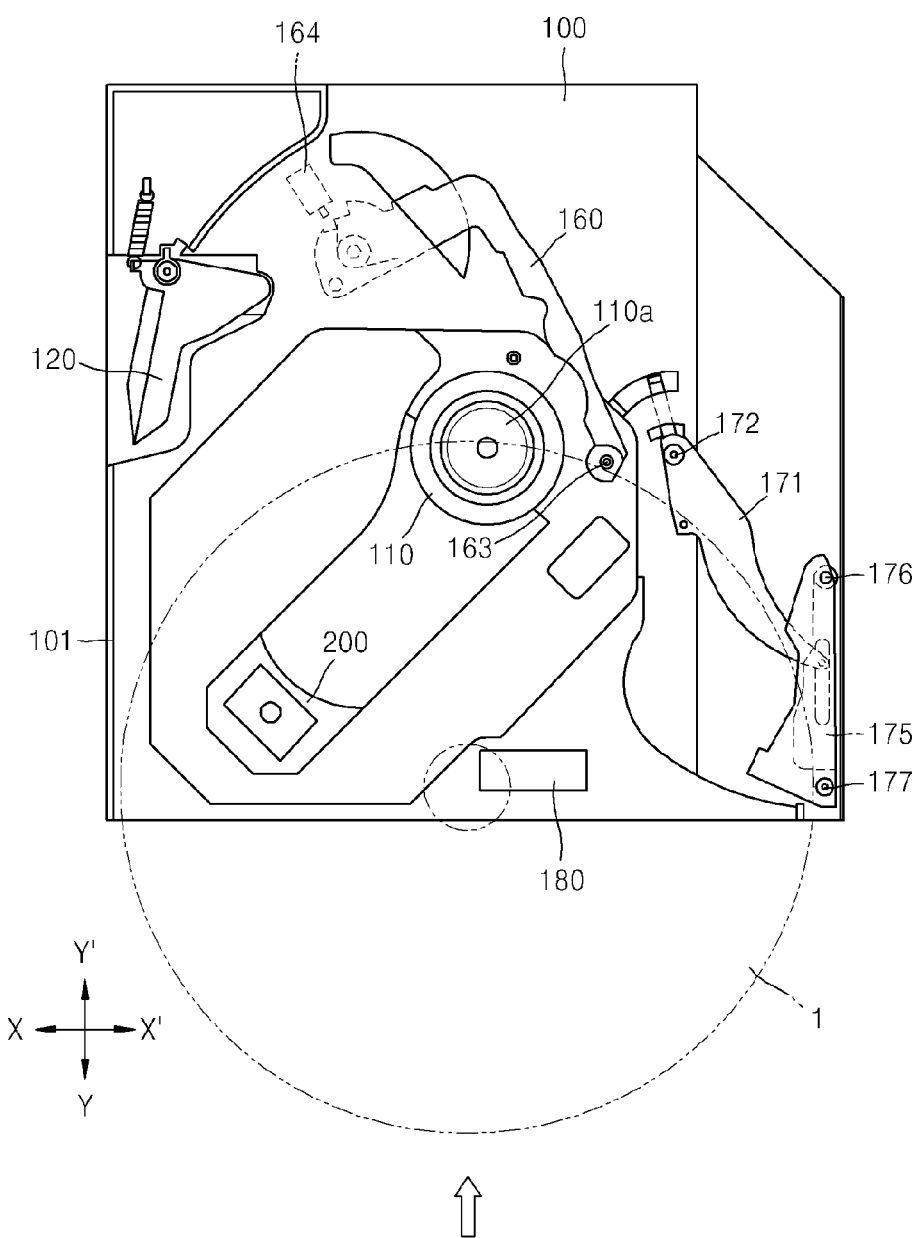

Referring to FIG. 5, the elements of the disk loading apparatus are disposed at initial positions prior to the inserting of a disk. The disk centering lever 120 is elastically biased in a clockwise direction, and the disk eject lever 160 rotates as much as possible in the clockwise direction so that the eject member 163 is disposed near the spindle motor 110. Meanwhile, the second loading lever 175 rotates anti-clockwise to be away from the spindle motor 110. When the disk 1 is inserted, the disk 1 travels along the straight disk guide wall 101 formed at the left side of the frame base 100, as illustrated in FIG. 5, to interfere with the eject member 163 of the disk eject lever 160, thereby rotating the disk eject lever 160 anti-clockwise.

Figure 7:
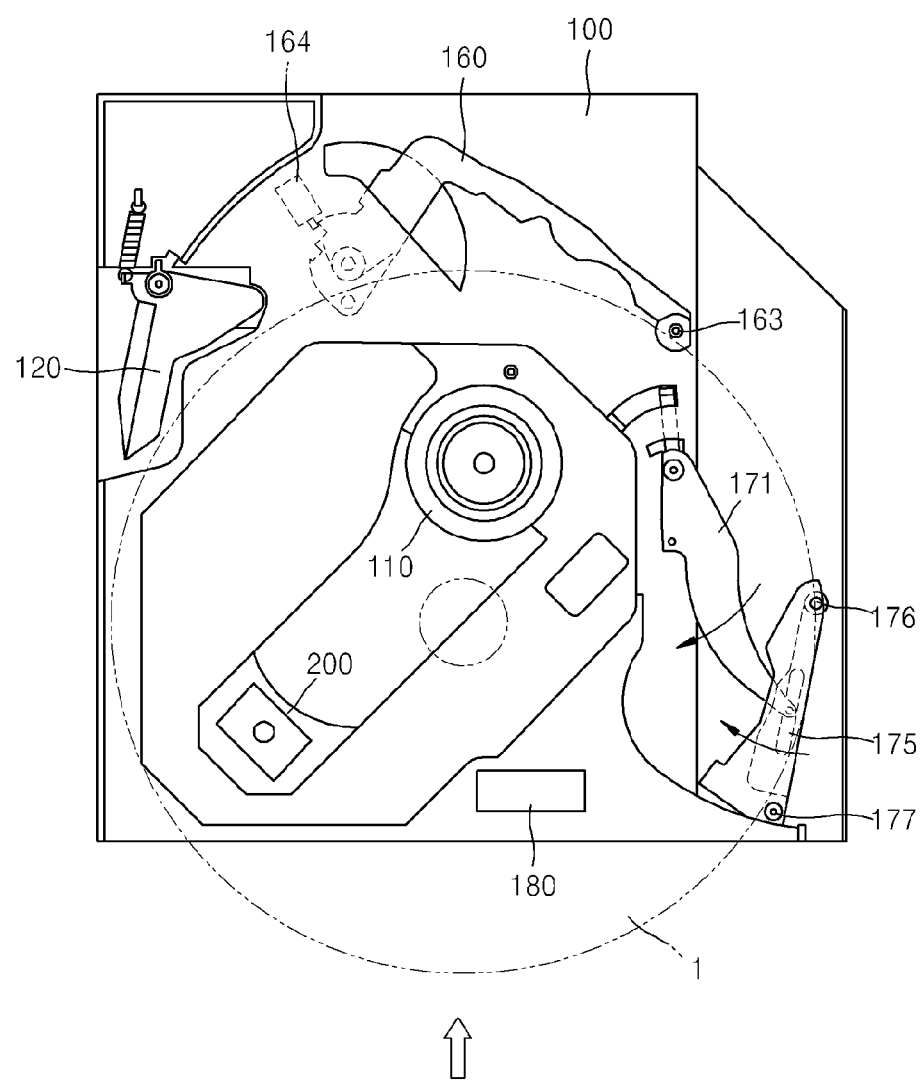

As illustrated in FIG. 7, as the disk 1 is inserted further, a switch 164 disposed near a shaft of the disk eject lever 160 is triggered to operate to drive the disk loading motor 180. Accordingly, the loading lever structure 170 is operated via the main slider 140 which operates via the disk loading motor 180. The first loading lever 171 is operated directly in connection with the main slider 140 that moves in a direction that is guided by the slider guide walls 103, 104, and 106. As the first loading lever 171 rotates clockwise, the second loading lever 175 which is in connection with the first loading lever 171 also rotates clockwise.

Figure 8:
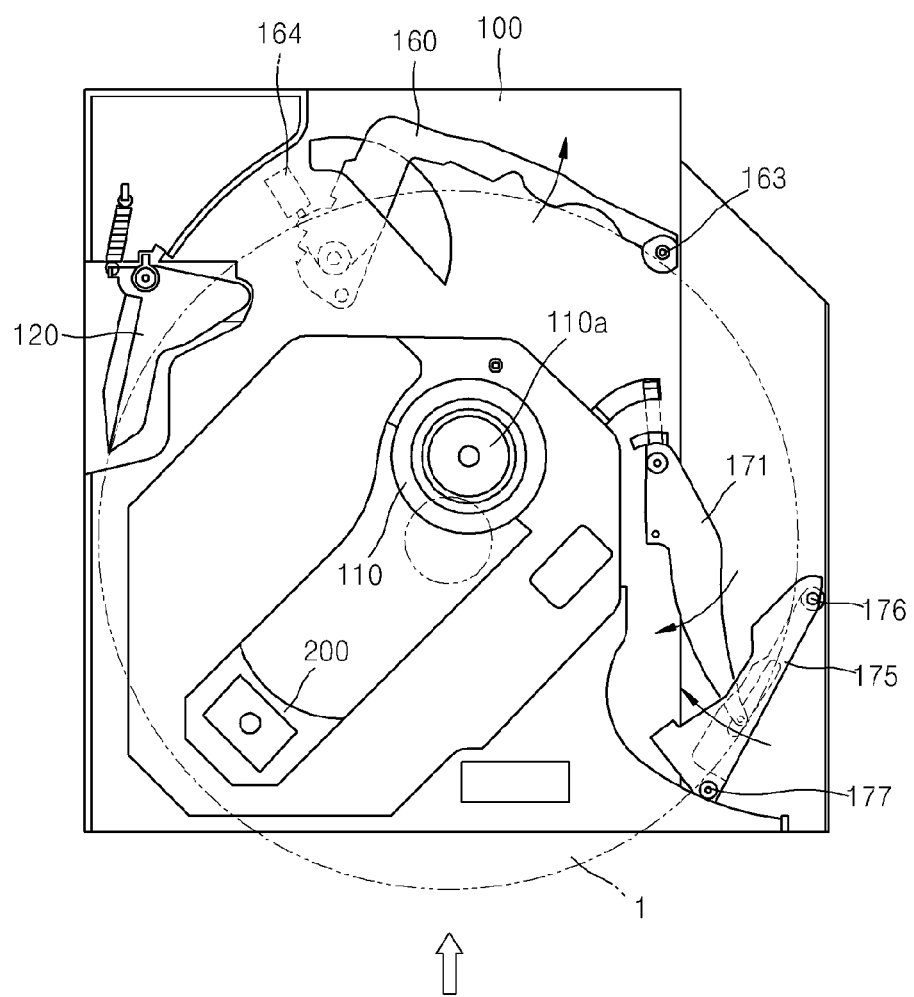
Figure 9:
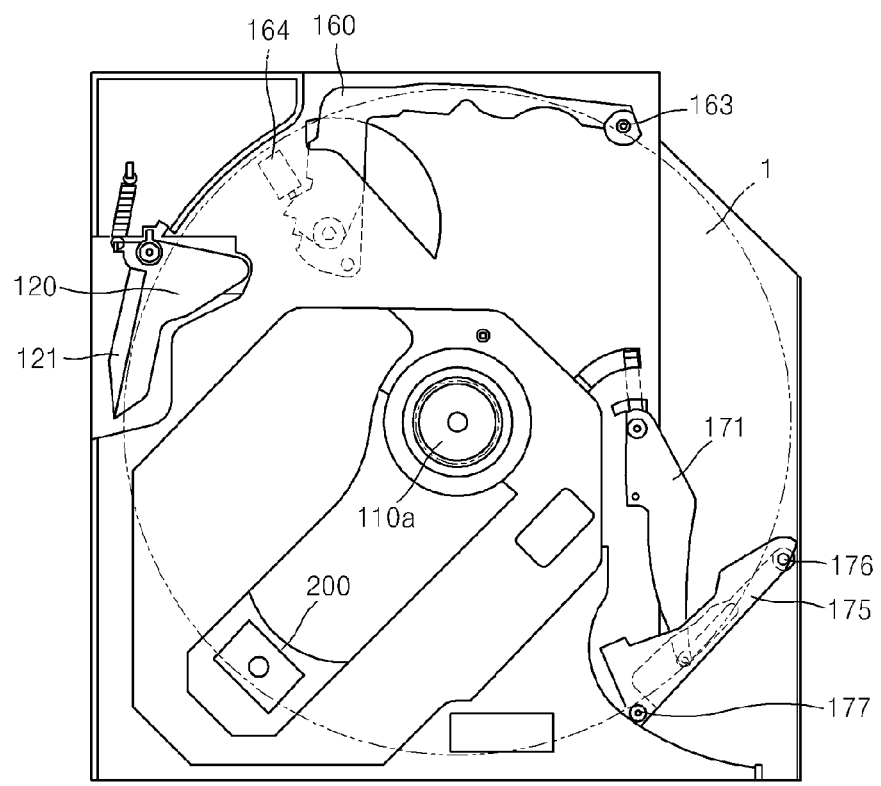

Accordingly, as illustrated in FIG. 7, the disk 1 is loaded by the first loading lever 175 without help of external force, and is centered with respect to the spindle motor 110, as illustrated in FIG. 8. Here, the center hole 1a of the disk 1 which is inserted with the disk guide wall 121 of the disk centering lever 120 and the first loading lever 175 of the disk eject lever 160 is disposed directly above the spindle 110a. In various examples, whether the disk 1 is centered or not may be detected using a switch (not shown) that may be operated by the main slider 140.

In response to centering of the disk 1 being completed, the spindle motor 110 may be raised by an operation of the sub-frame 210, and the center hole 1a of the disk 1 receives the spindle 110a and the disk 1 is safely mounted. If safe mounting (loading) of the disk 1 with respect to the spindle 110a is completed, as described above, the disk guide wall 121, the eject member 163, and the loading member 177 may be separated from the edge portion of the disk 1. Accordingly, the disk 1 may be rotated as desired by the spindle motor 110. The separation of the disk guide wall 121, the eject member 163, and the loading member 177 from the edge portion of the disk 1 is conducted by operating the disk centering lever 120, the disk eject lever 160, and the second loading lever 175, respectively, via the main slider 140 and the sub-slider 130 which are operated using the disk loading motor 180.

Figure 10:
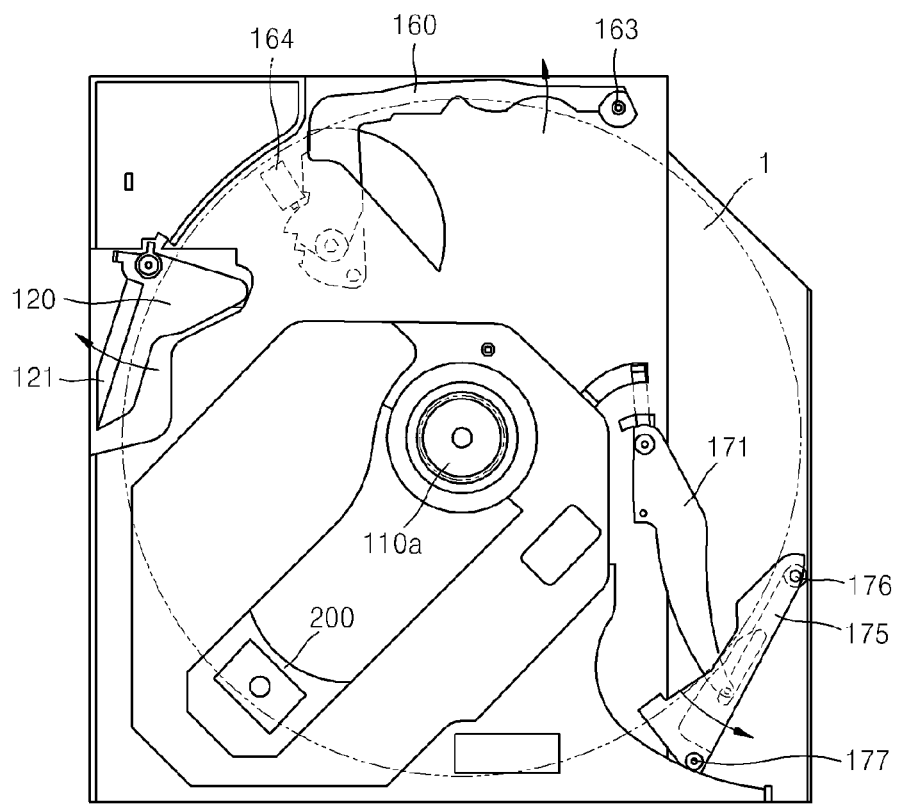
Figure 11:
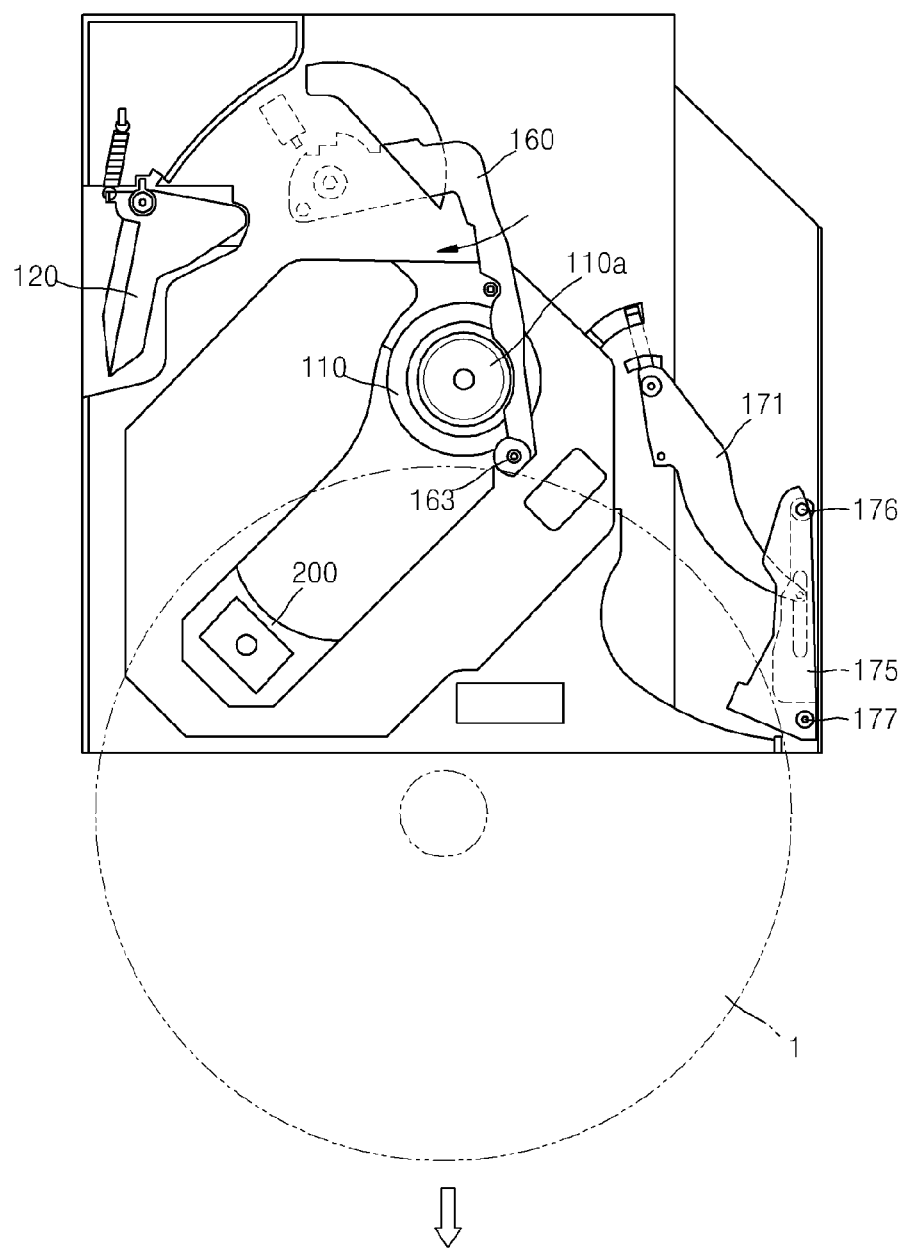

Unloading of the disk 1 is performed in the reverse order of that of the loading described above. For example, as illustrated in FIG. 10, ejecting of the disk 1 is performed by rotating of the disk eject lever 160 operated via the disk loading motor 180. During unloading, the disk 1 is first separated from the spindle motor 110, and then the disk eject lever 160 operates to discharge the disk 1, that is, to eject the disk 1 as shown in FIG. 11.

In the examples herein, while the specific connection structures between the elements of the motive power transferring structure from the disk loading motor 180 such as the main slider 140, the sub-slider 130, the disk centering lever 120, the disk eject lever 163, and the loading lever structure 170 connected to the sliders are not described, design of similar structures with which the above-described operations may be obtained will be obvious to one of ordinary skill in the art.

According to various aspects, a disk loading apparatus including a slider guide wall and a shaft that are integrally formed on a frame base, and a fixed guide wall and a centering lever that is rotatably installed on the fixed guide wall is described. Accordingly, an optical disk drive including the disk guiding structure is easy to assemble and the manufacturing costs thereof are also low. Moreover, the disk guiding structure may be designed only for use of single-standard disks, for example, for 12 cm-diameter disks, and thus, the structure of the disk guiding structure is simplified in comparison to a structure used for various sizes of disks, and manufacturing costs are also reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed:

1. A disk loading apparatus comprising:
   a frame base on which a spindle motor is mounted;
   a disk loading structure comprising a gear unit which includes a loading lever that loads a disk on the spindle motor, a plurality of sliders operating in connection with the loading lever, a loading motor that provides motive power to the plurality of sliders, and a plurality of gears transferring the motive power of the loading motor to the plurality of sliders;
   a disk guide wall that is disposed at a side of the frame base to guide a loading of the disk, the disk guide wall being integrally formed with the frame base;
   a plurality of shafts to which the plurality of gears are rotatably coupled, the plurality of shafts being integrally formed with the frame base; and
   a plurality of slider guide walls that guide movement of the plurality of sliders, the plurality of slider guide walls being integrally formed with the frame base.

2. The disk loading apparatus of claim 1, wherein the plurality of sliders comprise:
   a main slider that operates in direct connection with the gear unit; and
   a sub-slider that is disposed perpendicular to the main slider and operates in connection with the main slider.

3. The disk loading apparatus of claim 1, further comprising:
   a rotating-type disk centering lever that is disposed adjacent to the disk guide wall to center an inserted disk with respect to the spindle motor;
   a disk eject lever to unload the disk that is loaded on the spindle motor, at a back of the frame base; and
   a shaft that supports rotation of the disk eject lever, wherein the shaft is integrally formed with the frame base.

4. The disk loading apparatus of claim 3, wherein the disk centering lever comprises a shaft that is coupled to the frame base and an operating wall body that contacts and becomes separated from an edge portion of the disk.

5. The disk loading apparatus of claim 1, wherein the frame base is formed of plastic.

6. An optical disk drive comprising:
   a frame base;
   a sub-frame that is rotatably installed with respect to the frame base in a direction perpendicular to a plane of the frame base;
   a spindle motor mounted on the sub-frame;
   an optical pickup unit installed on the sub-frame at a side of the spindle motor;
   a disk loading structure comprising a gear unit including a loading lever that loads a disk on the spindle motor, a plurality of sliders operating in connection with the loading lever, a loading motor that provides motive power to the plurality of sliders, and a plurality of gears transferring the motive power to the plurality of sliders;
   a disk guide wall that is disposed at a side of the frame base to guide a loading of the disk, the disk guide wall being integrally formed with the frame base;
   a plurality of shafts to which the gears are rotatably coupled, the plurality of shafts being integrally formed with the frame base; and
   a plurality of slider guide walls that guide movement of the plurality of sliders, the plurality of slider guide walls being formed integrally with the frame base.

7. The optical disk drive of claim 6, wherein the plurality of sliders comprise:
   a main slider that operates in direct connection with the gear unit; and
   a sub-slider that is disposed perpendicular to the main slider and operates in connection with the main slider.

8. The optical disk drive of claim 6, further comprising:
   a rotating-type disk centering lever that is disposed adjacent to the disk guide wall to center an inserted disk with respect to the spindle motor;
   a disk eject lever to unload the disk loaded on the spindle motor at a back of the frame base; and
   a shaft that supports rotation of the disk eject lever, wherein the shaft is integrally formed with the frame base.

9. The optical disk drive of claim 8, wherein the disk centering lever comprises a shaft that is coupled to the frame base and an operating wall body that contacts or is separated from an edge portion of the disk.

10. The optical disk drive of claim 6, wherein the frame base is formed of plastic.

11. A frame base for a slot-in optical disk drive that includes an optical disk loading structure which has a plurality of sliding members for guiding the centering of a disk that is inserted and a plurality of levers for loading and unloading the disk, the frame base comprising:
    a slider guide wall for controlling the movement of the plurality of sliding members for guiding the centering of the disk that is inserted; and
    a plurality of gear shafts for receiving gears of the respective plurality of levers,
    a disk guide wall configured to guide a first portion of an edge of the disk that is being inserted,
    wherein the frame base, the slider guide wall, the disk guide wall, and the plurality of gear shafts are integrally formed as a single component.

12. The frame base of claim 11, wherein a body of the frame base is formed of plastic.

13. The frame base of claim 11, further comprising a spindle motor that is integrally formed with the frame base.

14. The frame base of claim 11, wherein the plurality of sliding members are configured to guide another portion of the edge of the disk that is being inserted.

15. The frame base of claim 11, wherein the frame base, the slider guide wall, and the plurality of gear shafts are manufactured to be the single component.

* * * * *